C. ELLIS.
HYDROGENATING OILS AND GREASES.
APPLICATION FILED APR. 25, 1912.
1,043,912.
Patented Nov. 12, 1912.
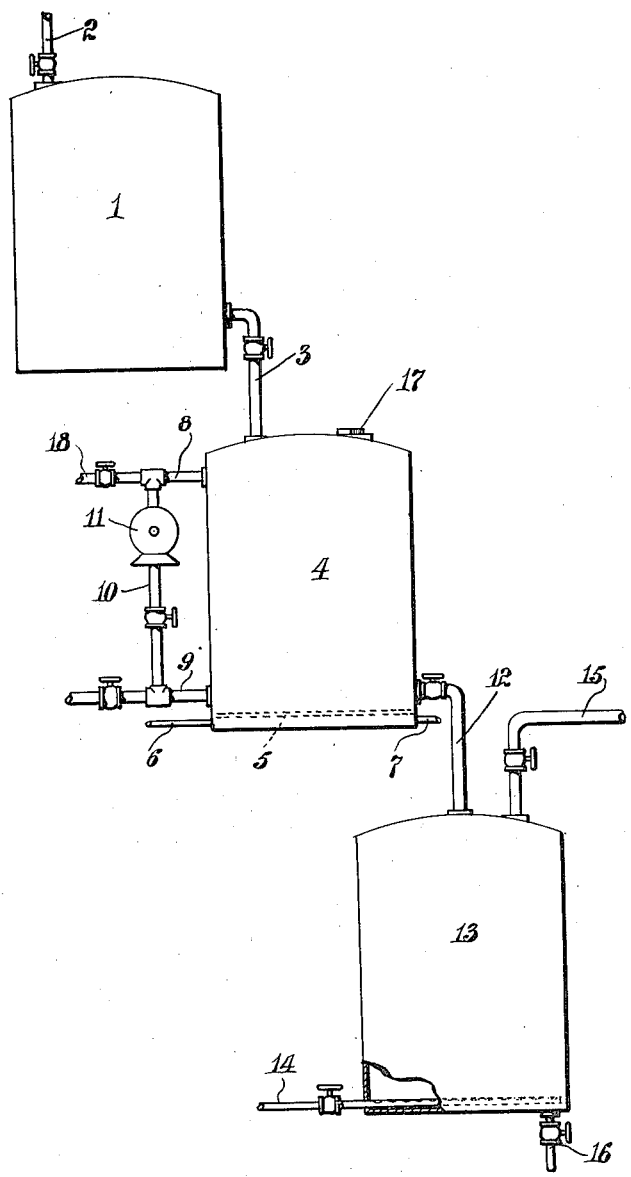
Attest:
Inventor:

UNITED STATES PATENT OFFICE.

CARLETON ELLIS, OF MONTCLAIR, NEW JERSEY.

HYDROGENATING OILS AND GREASES.

1,043,912.  Specification of Letters Patent.  Patented Nov. 12, 1912.

Application filed April 25, 1912. Serial No. 693,219.

*To all whom it may concern:*

Be it known that I, CARLETON ELLIS, a citizen of the United States, and a resident of Montclair, in the county of Essex and State of New Jersey, have invented certain new and useful Improvements in Hydrogenating Oils and Greases, of which the following is a specification.

This invention relates to the hydrogenation of oily bodies and the removal of ill-smelling gases formed during the hydrogenation step and has for its object the hardening and deodorizing, and also, preferably the bleaching of oils and greases, comprised by the term oily bodies and relates more particularly to the purification of foul or ill-smelling oily bodies, such as garbage grease, sewer grease, greases and oils obtained from the washings of textile mills, oil foots, such as cotton-seed oil foots, fish oil, such as menhaden oil, various extracted greases such as the oily material obtained from sheepskins and spent fullers' earth and the like, all as more fully hereinafter described and claimed.

My process involves the treatment of oily bodies with hydrogen in the presence of a metallic or other suitable catalyzer, preferably also subjecting the oily body subsequent to hydrogenation to the action of steam under considerable pressure; whereby a substantially gas-free oily body is obtained substantially free from odor, of improved consistency and often of improved color.

In the step of hydrogenation, I preferably free the oil from water by warming it until liquid and allowing the water to settle. The oil may then be dried if desired, by using chemical drying agents, such for example as calcium chlorid, or by heating to expel the moisture. The oil is then brought into contact with hydrogen gas in the presence of a catalyzer such as finely divided nickel, at a temperature usually from 150° C. to 200° C. or so; 165° C. being about the average working temperature for many of the oily bodies above mentioned. A lower temperature is sometimes desirable from the point of view of discoloration by heat and polymerization and with a very sensitive catalyzer and especially when employing hydrogen gas under high pressure, much lower temperatures may be maintained.

Catalyzers of a metallic character, such as nickel iron, copper, palladium, platinum, cobalt, chromium, manganese, vanadium, tungsten, selenium, aluminum and the like may be employed, the selection of the catalytic material depending upon the oil to be treated, as well as the temperature and pressure to be maintained.

After treating the oil with hydrogen in the foregoing manner, the catalyst is removed, and the material is heated preferably to a temperature of about 160° C. to 165° C. and steam under pressure of about 120 lbs. is blown through the oil for a short time until the desired degree of purification is secured. By placing the oil under reduced atmospheric pressure during this operation, the final purification is more satisfactorily and quickly reached. Instead of using steam and the pressure mentioned, a lower pressure may be used, but the steam may be superheated, it being desirable to maintain a temperature during the steam blowing operation of approximately that employed during the operation of hydrogenation as thereby undesirable noxious gases and volatile products resulting from the reactions during hydrogenation, especially at high temperatures, are very effectively removed. While steam is preferably employed as the agent for blowing the oils in this manner, it is also possible to use heated air under some circumstances, or if the oil is unduly oxidized in this way, inert gases such as carbon dioxid or nitrogen may be employed.

As an illustrative example of the manner in which my process may be carried out I may take, for instance, garbage grease and add to it about 1% or 2% of finely divided nickel, which has been prepared by reducing nickel oxid with hydrogen and the oil is then heated to a temperature of about 160° to 165° C. and brought into contact with hydrogen gas, preferably under a pressure of 10 to 25 pounds. After the unsaturated bodies contained in the oily material have been saturated by the addition of hydrogen to the desired degree, the material is then freed from the catalytic body by filtration or in any other suitable manner, and is subjected to the blowing action of a current of steam under about 120 lbs. pressure, while maintaining the oil at approximately the temperature maintained during the stage of hydrogenation, at the same time reducing the pressure within the receptacle containing the oil some 8″ or 10″ (water gage) or so below the normal atmospheric pressure. By blowing in this manner for fifteen or twenty minutes, the oil is substantially freed from the occluded gaseous bodies including any noxious gases and other volatile ill-smelling products present in the oil or formed during the stage of hydrogenation and a very pure, deodorized oil of improved consistency is secured.

The oil may be bleached during the steaming operation or otherwise, by means of a suitable bleaching agent, such for example as hydro-sulfites, or treatment with fullers' earth and the like.

When employing nickel carbonyl to produce a catalytic material, the oil preferably should be heated to a temperature some 5° or 10° above the temperature of decomposition of the nickel carbonyl under the particular circumstances of operation.

The accompanying diagrammatic drawing shows in elevation an apparatus suitable for carrying out the present process.

In the drawing 1 is a supply or preliminary purifying tank in which the oil may be dried or otherwise prepared for hydrogenation. This tank has a feed or supply pipe 2 and a discharge pipe 3. The latter communicates with the hydrogenation tank 4. This tank is equipped with a steam-jacketed base 5 having the steam inlet 6 and outlet 7.

8, 9 and 10 are pipes or conduits in which is interposed the pump 11.

17 is a plugged aperture for the admission of catalyzer.

18 is an inlet for hydrogen. The oil outlet pipe 12 leads to the tank 13 which has a steam inlet 14 and an outlet pipe 15 connecting with vacuum apparatus not shown. This may be any suitable evacuating pump.

16 is a draw-off for the treated oil or fat.

In the operation of this illustrative apparatus in accordance with the process of the present invention the oil is drawn from the supply tank 1 into the hydrogenation tank 4 to fill the latter about two thirds full or so. A quantity of catalyzer is introduced and a current of hydrogen is continuously circulated through the body of oil and catalyzer in the tank 4 by means of the pump 11, that is to say, the initial supply of hydrogen or hydrogen-containing gas enters at 18 and the pump 11 passes this through the pipes 10 and 9 into the tank 4 where it bubbles through the oil and some portion of the hydrogen is absorbed. The unabsorbed gas passes from the tank by the pipe 8 and again through the pump 11 thus traveling in a cyclic path. During this operation the oil is heated by steam entering the heating base 5 at 6. When hydrogenated, the oil is run into the tank 13 and regulated quantities of superheated steam are entered by the pipe 14, a vacuum being maintained in the space above the body of oil in the tank 13. The treated oil is withdrawn at 16. The method of hydrogenation set forth above is merely for purposes of illustration as any other suitable procedure for carrying out the hydrogenation step may of course be employed.

What I claim is—

1. The process of treating oily material such as foul oils and greases which comprises subjecting said oily material in a heated condition to the action of hydrogen under pressure in the presence of a finely divided nickel catalyst, whereby said material is substantially hydrogenated and ill-smelling gaseous compounds are simultaneously formed, and in then subjecting said oily material to the action of a current of steam under high pressure while maintaining said oily material under reduced atmospheric pressure and at an elevated temperature, to substantially remove said gaseous compounds.

2. The process of treating oily material such as foul oils and greases, which comprises subjecting same to the action of a hydrogen-containing gas in the presence of a catalyst, whereby said material is substantially hydrogenated and noxious gaseous compounds are simultaneously formed; and subsequently removing said gaseous products of decomposition formed during hydrogenation.

3. The process of treating oily material such as foul oils and greases, which comprises subjecting same to the action of hydrogen in the presence of a catalyst, whereby said material is substantially hydrogenated and noxious gases are simultaneously formed; and in subsequently freeing the oil of said gaseous bodies absorbed during hydrogenation.

4. The process of treating oily material containing unsaturated bodies, which comprises subjecting said material in a heated condition to the action of hydrogen under pressure in the presence of a catalyst, whereby said material is substantially hydrogenated and noxious gaseous compounds are simultaneously formed; and in subsequently blowing said material with steam to substantially remove said gaseous compounds.

5. The process of treating oily material containing unsaturated bodies which comprises subjecting said material in a heated condition to the action of a hydrogen-containing gas in the presence of a catalyst, whereby hydrogen is added to said unsaturated bodies and gaseous compounds are simultaneously formed; and in subsequently blowing the heated oil with steam; whereby said gaseous compounds are removed.

6. The process of treating oily material containing unsaturated bodies which comprises subjecting said oily material in a heated condition to the action of a hydrogen-containing gas in the presence of a catalyst, whereby hydrogen is added to said unsaturated bodies and ill-smelling gaseous compounds are simultaneously formed; and in subsequently subjecting the hot material under reduced atmospheric pressure to the action of a current of steam under pressure, whereby the ill-smelling gaseous products formed during hydrogenation are eliminated.

7. The process of treating oily material such as foul oils and greases, which comprises subjecting same to the action of hydrogen in the presence of a catalyst, whereby said material is materially hydrogenated and noxious volatile bodies are simultaneously formed; and in subsequently freeing the oil of said volatile bodies absorbed during hydrogenation.

Signed at Montclair in the county of Essex and State of New Jersey this 24th day of April A. D. 1912.

CARLETON ELLIS.

Witnesses:
 BIRDELLA M. ELLIS,
 THOS. F. ROCHE.